Sept. 12, 1950          I. M. DILLER          2,522,100
METHOD OF FORMING PROPELLER BLADES
Filed Jan. 24, 1946          3 Sheets-Sheet 1
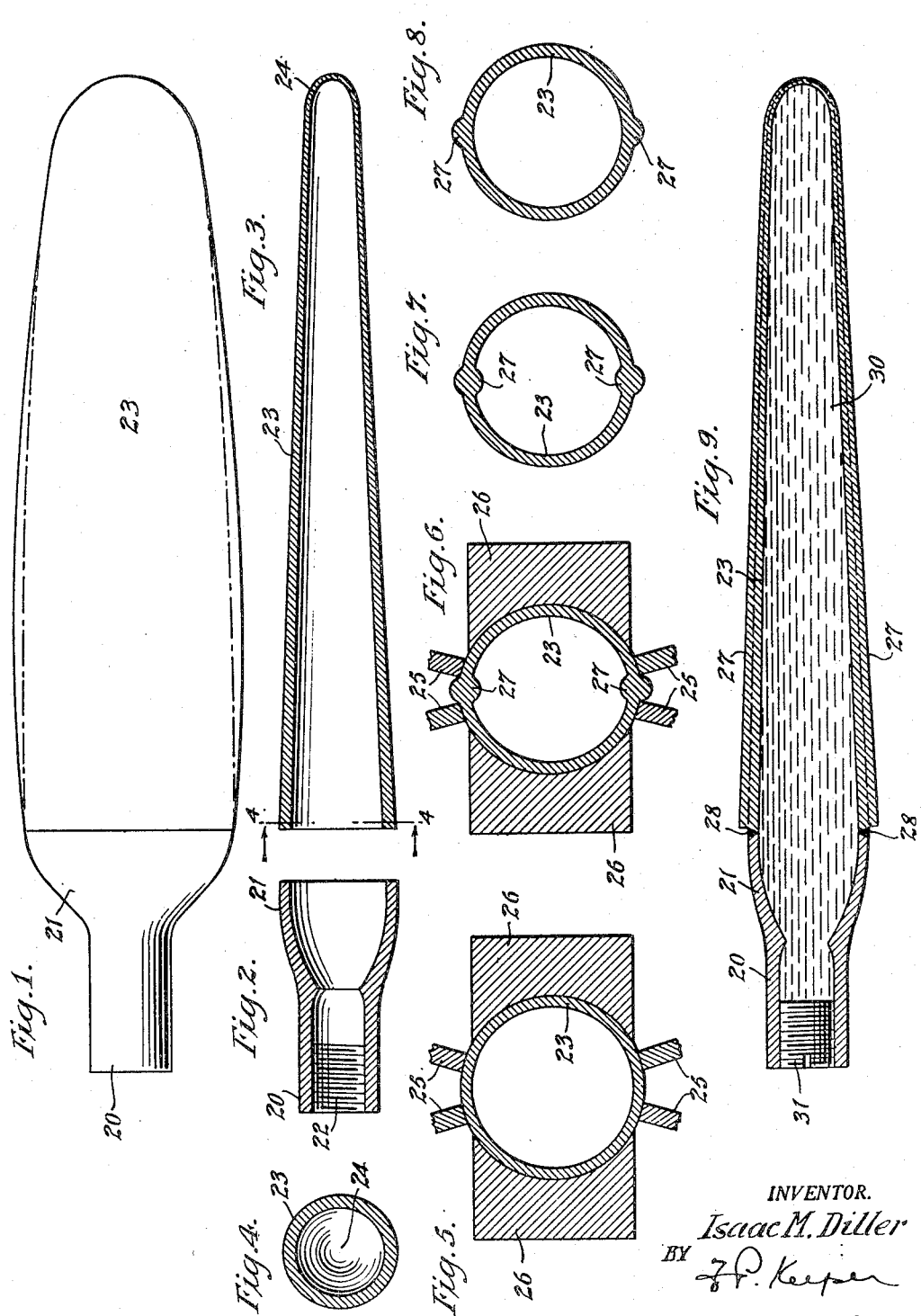
INVENTOR.
Isaac M. Diller
BY
ATTORNEY Sept. 12, 1950             I. M. DILLER             2,522,100
METHOD OF FORMING PROPELLER BLADES
Filed Jan. 24, 1946             3 Sheets-Sheet 2
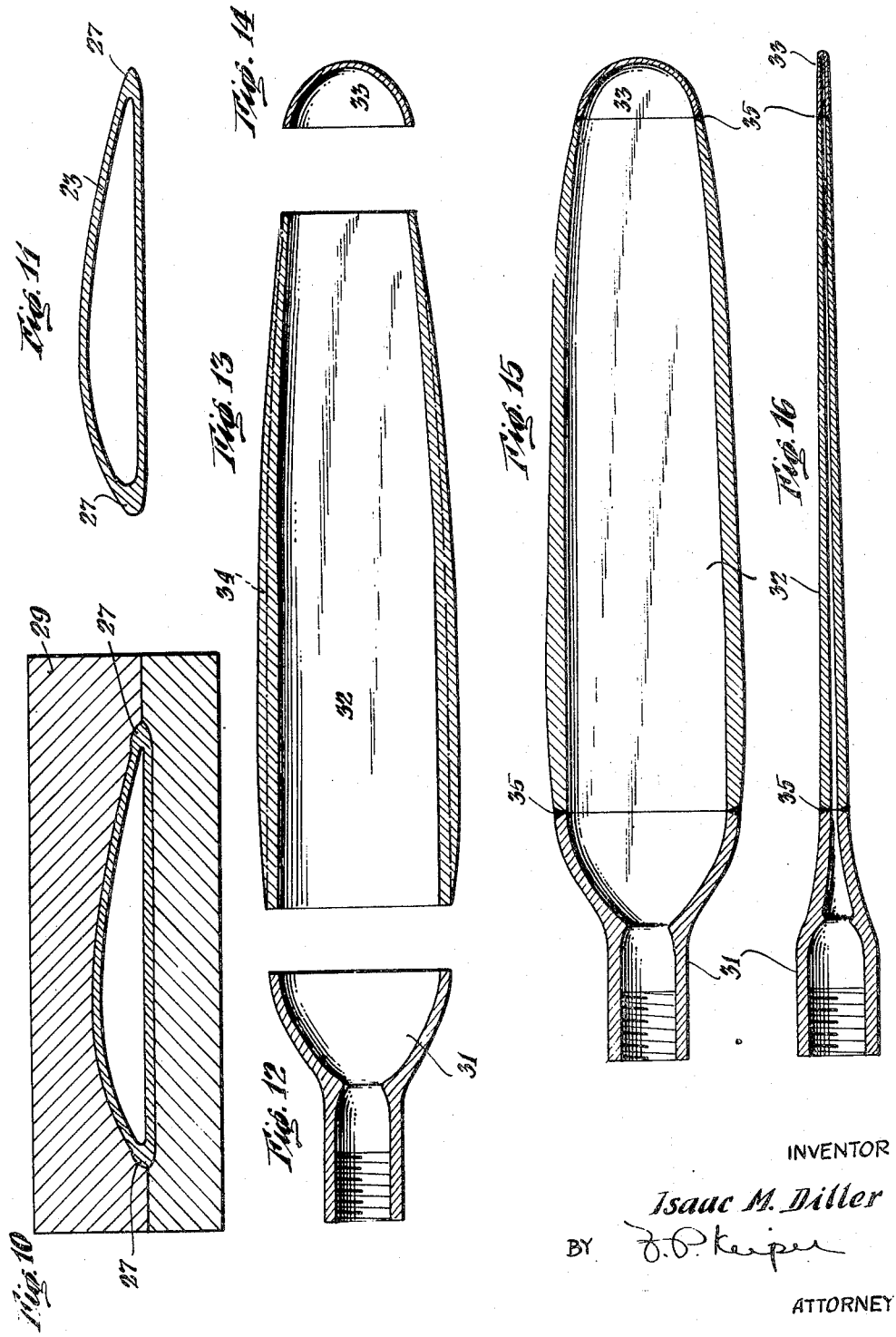
INVENTOR
*Isaac M. Diller*
BY *J. P. Keiper*
ATTORNEY

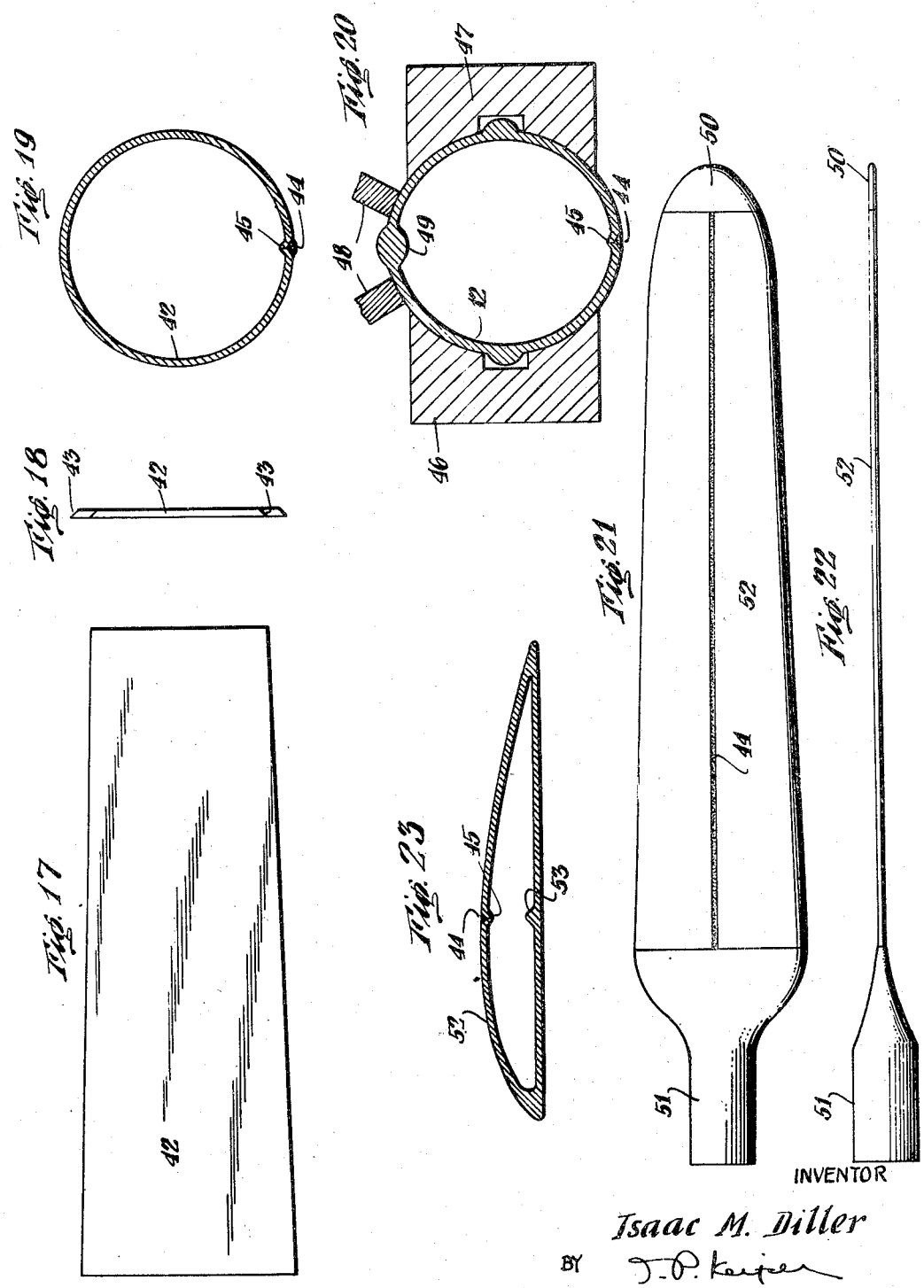

Patented Sept. 12, 1950

2,522,100

UNITED STATES PATENT OFFICE 2,522,100

METHOD OF FORMING PROPELLER BLADES

Isaac M. Diller, Glen Ridge, N. J.

Application January 24, 1946, Serial No. 643,089

3 Claims. (Cl. 29—156.8)

This invention relates to a structurally and functionally improved hollow propeller blade, as well as a method of making the same.

In its more specific aspects, it is an object of the invention to provide a blade such as is utilized in aircraft and which blade will be better able to withstand stresses at critical points or zones as well as the tremendous vibrational forces involved. Welds are placed where the blade is least vulnerable. A rough interior is permitted where there is substantially no vibration. Those portions of the blade which must be notch free in view of the vibration will be susceptible of economically and feasibly receiving a fine mirror finish.

A further object is to construct a blade in which the leading and trailing edges are thickened so as to provide a beam of uniform stress. At the same time, these edges are not excessively thickened and consequently the present blade will have a minimum tendency towards vibration.

Another object is that of constructing a blade in which the cross-sectional area may vary throughout the entire length of the blade so that the latter will conform to a maximum degree to desirable aerodynamic characteristics. Additionally, blades of my invention may be dynamically balanced to a proper degree in substantially a predetermined manner so that the balancing is, in effect, accomplished during the process of manufacture instead of afterward.

A still further object is that of furnishing a blade which may incorporate desirable strengthening factors such as notch-free internal ridges for stiffening, which ridges will be properly disposed with reference to the body of the unit. Moreover, the blade may have its leading and/or trailing edges thickened or reinforced; this being especially desirable with reference to the leading edge to guard against the abrasive action of the atmosphere as the blade is spun.

An additional object is that of teaching a method of manufacture by means of which any or all of the foregoing results may be achieved. Specifically, where such teachings are followed, the interior of the blade will be free from extensions, fins or notches resulting from welding or similar operations and where such variations in the thickness of the metal might contribute to unnecessary stress localization.

Another object is that of teaching a method by means of which the portions of a blade are fabricated to provide an initial tubular body and in which, at any point along the length of the blade, the circumference is equal to the circumference at that point after the body is flattened and shaped to provide the finished blade configuration. Also, the metal thickness at such point is equivalent to the ultimate thickness desired except where supplementary strengthening factors (such as rounded ridges) are subsequently provided.

Moreover, by means of the present teachings, a blade is furnished, the main vibrational section of which varies in circumference in one direction only. Consequently, costs are reduced to a minimum, work may readily be performed on the blade, and the latter will be of high quality. The interior of this section can be given a mirror finish such as is desirable in order to provide a notch-free surface and therefore one capable of withstanding a maximum of vibrational fatigue.

Still another object is that of providing a method of manufacture which may be practiced without the use of special and expensive equipment or highly trained technicians, such method lending itself to quantity production techniques with uniform quality and characteristics embodied in a successive series of blades.

With these and other objects in mind, reference is had to the attached sheets of drawings illustrating practical embodiments of the invention, and in which:

Fig. 1 is a face view of a blade constructed in accordance with the present teachings;

Fig. 2 is a sectional side view of the shank portion prior to its coupling with the blade portion;

Fig. 3 is a sectional side view of the blade portion prior to its final forming;

Fig. 4 is an end view taken along the lines 4—4 and in the direction of the arrows as indicated in Fig. 3;

Fig. 5 illustrates diagrammatically the initial step resorted to where a reinforced edge or edges are to be incorporated in the blade or where a stiffener or stiffening ridges are to be incorporated in the faces of the blade;

Fig. 6 shows the position which the parts illustrated in Fig. 5 subsequently assume;

Fig. 7 is a sectional view of a blade portion after an operation such as has been shown in Fig. 6 is completed;

Fig. 8 is a view similar to Fig. 7 but showing a further step in the method;

Fig. 9 is a sectional view taken through a blade portion and illustrating the manner in which the leading and trailing edges of the blade are reinforced or thickened and with the shank portion coupled thereto;

Fig. 10 is a sectional view through a mold— which has been shown somewhat diagrammatically—and with a shaped blade disposed therein;

Fig. 11 shows the blade portion, as in Fig. 10, removed from the mold and with excess parts removed therefrom;

Fig. 12 is a sectional plan view of a shank portion similar to that illustrated in Fig. 2;

Fig. 13 illustrates in section the initial configuration of a blade section or portion to which a separate tip portion is to be attached;

Fig. 14 is a similar view of such tip portion;

Fig. 15 is a sectional plan view of a hollow blade embodying the portion shown in Figs. 12, 13 and 14;

Fig. 16 is a sectional side view of such blade;

Fig. 17 is a face view of a blank which may be employed to provide a blade embodying the advantages of the present invention;

Fig. 18 is an end view of such blank;

Fig. 19 illustrates the sheet as shown in Fig. 17 after it has been rolled into tubular configuration and welded;

Fig. 20 is a view similar to Figs. 7 and 8 but illustrating the technique which may be followed in providing a reinforcing rib or portion in a blade which may be formed of the parts as shown in Figs. 17 to 19;

Fig. 21 is a face view of a blade which may result from the manufacturing steps and units as somewhat diagrammatically shown in Figs. 17 to 20 inclusive;

Fig. 22 is an edge view of such blade prior to the twisting step; and

Fig. 23 is a sectional view through such blade.

As is well appreciated, the construction of hollow blades for use in aircraft has presented numerous difficulties. This is especially true because of the large continual and varying vibrational stresses to which the blades are subjected in use. Sharp changes of contour will cause vibrational stress localization in the metal structure. Welding techniques which may be most satisfactory from an ordinary constructional point of view may cause stress localization in propeller blades with consequent rupture of the weld. Also, scratches, pits and ragged edges of welding beads will cause stress localization in most parts of the blade.

Blades of the most modern design from an airfoil point of view are extremely thin in relation to width. Therefore, the correction of matters of contour is made extremely difficult. Additionally, the shank portion of such blades is substantially narrower than the maximum width of the blade. Therefore, it is difficult, if not impossible, to introduce tools through the shank portion for the purpose of machining and eliminating jagged edges, beads or sharp changes of contour in the interior of the blade body.

Generally stated, certain parts of the blade are less subject to vibrational or bending stresses than are other parts of the same. The portion of the blade substantially midway between the leading and trailing edges thereof is less subject to vibrational stress than those edges. Therefore, relative weakness of weld can be better tolerated along these center zones than adjacent the edges. At such edges an increase in weight results in an increase in amplitude of vibration. Despite this, under present day practice, welds are still placed—in certain instances —adjacent the leading and trailing edges of the blade. This is because, by so placing them, it is convenient to pour copper or other meniscus-forming material over the interior of the welds in order to ease the effect of the jagged material of the welding bead.

According to one technique, a blade is made of a single billet without any seams. Such procedure requires a degree of forming manipulation which is not only extremely expensive but imparts tremendous stresses in the steel body. These stresses can never be entirely eliminated by subsequent heat treatment. Also, the airfoil design is limited. The stressing and forming operation is particularly difficult and undesirable because of the difference in cross-sectional area which must be embodied in the blade. In this connection, it will be understood that according to preferred design a blade increases in relative size from the shank to less than 20% of its length. Thereafter, it decreases in cross-sectional area up to the end of the tip.

Practically all the hollow steel blades made today are not manufactured in accordance with the best aerodynamic design. Rather, they are compromises with methods of fabrication. It is now generally realized in the art that a blade should have its maximum width as near as possible to the shank portion and the decrease in width as one goes toward the tip should not be proounced. According to the teachings of the present invention, not only is this design attainable but it is actually ideally suited to the herein taught method of fabrication.

In the portions of the blade most nearly adjacent the shank and the extreme tip, changes of contour in the sense of jagged edges resulting from welding operations are not of great importance. According to the present teachings, advantage is taken of this fact to overcome most, if not all of the difficulties heretofore inherent to the manufacture of hollow blades. Also, advantage is taken of the fact that the blade faces substantially midway between their leading and trailing edges respond by a minimum increase in the amplitude of vibration to weight increase. Therefore, strengthening ribs or their equivalents may be provided at these points. Moreover, by the present technique, it is feasible to reinforce the blade adjacent one or both of its edges, and especially its leading edge, for the purpose of providing extra material along the zone which is most subject to the abrasive force of the atmosphere as the blade is spun. Also, by such construction a uniformly stressed beam results.

According to the present teachings, the blade may be manufactured from two initial sections or alternatively from three initial sections. The first of these will include a shank portion. If two sections are employed, the second will include the blade with an integral tip portion. On the other hand, if three sections provide the complete blade, the second portion will include merely the blade proper, while the third section will embrace the tip portion; all of these portions being connected to each other to provide the finished unit.

Thus, referring primarily to Fig. 2, the reference numeral 20 indicates a tubular shank portion which may include a flaring or outwardly extending part 21 adjacent its outer end. In accordance with conventional practice, the shank 20 is formed with threads 22 or other fastening means adjacent its inner end. Having in mind that this shank portion is a separately handled section, it is feasible and preferable to machine a billet to the final dimensions without the need of upsetting, the addition of rings, etc., after the entire blade is formed. As is apparent, however, this shank portion might be formed from a welded sheet instead of being formed from a billet. Such a shank portion ordinarily has a metal thickness of approximately 0.450″ in its initial stage. Subsequently, it is upset so that it has a thickness of substantially twice that figure. This permits the thread to be formed in the interior of the shank and imparts desired strength characteristics, etc. Where, according to my preferred procedure, the billet, or pierced billet, is machined to final dimensions without the need of upsetting, it is apparent that economy of manufacture results in addition to the fact that an article having high quality characteristics is provided.

Now referring to the body portion proper in Fig. 3, it will be seen that the numeral 23 indicates this body which extends outwardly and terminates in a tip portion 24. As also shown in this view, the thickness of the metal providing the body as well as the diameter of the body diminishes from the base or root of the blade towards the tip. The degree of taper has, for the purposes of illustration, been exaggerated in this figure as well as in Fig. 9 hereinafter referred to.

The blade is made in two or three sections comprising, in the latter instance, shank portion, body and tip. According to the design of the blade, the shank portion may be of greater or lesser length. It includes the shank proper and may include the portion adjacent the shank up to the point of maximum circumference. In other words, in the finished blade and starting with the end of the shank, the blade increases in circumference to a certain point and then decreases in circumference in the direction of the tip. The point at which this change in direction takes place is prior to completion of the blade, the dividing point between the body section and shank section. Welds in the vicinity of this dividing point are not subject to the heavy vibrational forces which prevail otherwise.

According to my invention, the shank and body portions are fabricated in circular cross section to have a radius at any point in accordance with the radius of a circle having a circumference equal to the final circumference at each point along the length of the blade. Initially, the body portion may have an internal volume in excess of that which will be incorporated in the finished blade. This will be true if thickened portions (for example: an edge, or both edges, a rib or bead, etc.) are to be incorporated in the blade section.

The body portion may be fabricated in one of a number of different ways. Conveniently, it is cast of suitable metal and forged, if desired, to impart a fine physical structure to the casting. Thereupon, it is turned in a lathe to produce an interior of the desired equivalent radial contour. The outside may be similarly machined in the lathe to produce to close tolerance the desired varying metal thickness. According to the method of procedure followed, either the body portion proper or the body portion plus the tip portion may be machined from a billet. As hereinafter described, this portion may be also fabricated from a flat sheet which varies in width in accordance with the variations of radius at any point along the length of this section of the blade.

In any event, it will be appreciated that with the body portion and shank portion as separate units and of either constant outside diameter or of uni-directionally varying outside diameter, it is entirely feasible for one to readily introduce tools into their interiors to render such surfaces completely notch-free. Also, these interior surfaces may have imparted to them precisely the desired dimension without its being necessary to resort to special tools and techniques. The procedure involving a separate tip section will hereinafter be described in detail.

Considering merely the formation of a blade of the type shown in Fig. 1, it will primarily be understood that such a blade should ordinarily incorporate thickening in both its trailing and leading edges. According to the present invention, this thickening is achieved in a manner hereinafter described. As is obvious, if the thickening at the leading or trailing edges is not necessary in certain types of blades or if the thickening be provided in a manner from that hereinafter traversed, then the teachings of the present invention may nevertheless be followed with respect to subsequent steps.

To secure thickening of the leading and/or trailing edges, a narrow heating zone for producing an upsetting operation may be created in any desired manner. For example, one or a number of single loop, high frequency coils with a gate may be utilized. This has been disclosed in my co-pending United States application for patent, entitled, "Welding Method, Apparatus and Article," Serial Number 541,873, filed June 24, 1944, now abandoned. Otherwise, and as shown especially in Fig. 5, electrodes 25 may be clamped on each side of the position of upset of the tube. Thereupon, a low voltage, high density current may be passed between the electrodes with frequent interruption of the current to assure proper thermal distribution. When this has occurred, the metal between the electrodes will have become heated sufficiently for upsetting, whereupon the necessary pressure is applied. This pressure may be achieved by employing supports or chuck portions 26 and moving them inwardly as indicated in Fig. 6 to produce the resultant upsets or thickenings 27. Where thickening is also desired adjacent the trailing edge, a second set of electrodes—as shown—may be employed, which will result in a second upset or thickening. I have found that an upset pressure on the order of 2,000 pounds per square inch is preferable for the hard steel alloys usually employed for blades. The heating should preferably be continued during the upsetting operation.

As will be understood during the upsetting operation the tube is compressed in a direction parallel to a tangent at the point of heating. The thickness of the metal which is expressed may be controlled by the width of the zone of heating and the extent and time of compression. A substantial time period (in the order of 30 to 120 seconds) must be allowed if a smooth contour is to result. As will be understood, where a thickening of both the leading and trailing edges is to be achieved, the upsetting through the zones 27 may occur either simultaneously or successively.

The heated zone lying between cold electrodes should preferably be one inch, the base of the thickening will be approximately ⅜ inch and under such circumstances the contour is gradual and the metal is not unduly stressed after cooling. The figures given are for the point where the metal thickness is ¼ inch. Both the spacing and the degree of upset are less as the metal thickness decreases. A current density of the order of 2,000 amperes per square inch of cross section at an equivalent of unity power factor is desired in the case of most steels as this current density with continuously cooled electrodes will introduce the heat at a suitable rate for an upset of rounded contour and will not bring the metal to fusion or too close to fusion. Whether for upsetting or welding, it is preferred to avoid reaching the fusion temperature. Other controls, such as current interruption and pressure variation may be used to regulate the rate of upsetting and the rate of heating and the maximum temperature.

The chucks shown in Figs. 5 and 6, as well as that shown in Fig. 20, hereinafter described, may be in the form of an electromagnet so that not only is there a positive pressure in the direction of upsetting but there is also a positive pressure with respect to the clamping in the dies so that the electrode pressure will not deform the material to be upset.

The resultant blade section, when removed from the chucks 26 and after such reshaping as may be necessary, presents the appearance—in section—of the unit shown in Fig. 7. As is apparent, ready access may be had to the interior of this unit for removing the inwardly extending beads or parts of the thickened portions 27. This may be accomplished in any desired manner and the interior surface of the body 23 may have imparted to it a polished surface free from all irregularities, protuberances or other undesired factors.

The shank section, as shown in Fig. 2 and including the portion 21 thereof, is preferably circular in its initial stage. Its diameter corresponds to the inner end of the blade section 23 as shown in Fig. 3. After the interior of the latter section has been cleaned and polished as afore brought out, it is connected to the shank section by welding as indicated by the reference numeral 28 in Fig. 9. This welding may be of any desired and proper type. For example, flash or arc welding may, in certain instances, be preferable. Under other conditions, induction welding or some other proper form of connecting the sections may be employed. If the method utilized results in the establishing of substantially no bead or else a bead of gradually changing contour at the zone of connection of the shank and blade sections, so much the better. If a jagged surface is the result of such welding, such surface or bead may be removed to the greatest extent by inserting a suitable tool or tools through the bore of the shank and operating on the inner surface adjacent the edge of the flared or cup portion 21 of the shank. In any event, if excess material occurs and is partially or wholly left at this zone of connection, it will be disposed at a portion of the blade where it can be tolerated.

Preferably after the shank and blade sections have been thus coupled, the excess parts of the exteriorly extending thickened portions 27 are machined or ground away. Accordingly, the shank section will merge into the blade section, and the latter may potentially incorporate the zone of maximum diameter of the finished blade. The method in which the excess of the thickened portions is removed will be readily apparent when examining Fig. 9 in comparison with Fig. 1 which shows the finished blade.

The blade is now generally complete with respect to having the required amount of metal at the proper places or zones. It is, however, necessary to change the contour of the blade at each point along its length with the possible exception of the circular end of the shank portion. Such result is conveniently accomplished by flattening the blade in dies 29—as in Fig. 10—and imparting the usual twist by any known method of forming operation. At the same time the part 21 of the attached shank portion is shaped. During this step, the blade may be heated to a temperature at which the metal is substantially plastic. In accordance with the present invention, the interior of the blade is filled with a liquid in a volume equal to the final volume or by methods known to the art it is placed under gas pressure while the dies are closed or by any other method the interior of the blade is protected from collapse.

This has been shown in Fig. 9 in which the interior of the blade has been placed under pressure during the shaping operation resulting from the use of these dies by preferably filling the hollow blade body with lead, tin or similar soft or low-melting and high-boiling material 30. By low-melting there is meant a metal which has a melting temperature below the lowest temperature at which the metal of the blade is to be formed. By high-boiling there is meant a temperature above the highest at which the blade will be heated for forming.

As indicated by the reference numeral 31 a plug may be inserted in the inner end of the shank portion. For this purpose the threads 22 may be employed. The molten lead or equivalent fluid material will maintain the internal volume of the blade. Such volume is initially the same as the final volume. Since the pressure in the die will be perpendicular to the faces of the blade, the equivalent radial correction at each point along the blade length will become the desired cross section at each such point. No special or supplementary internal pressures will be necessary in view of the fact that the inside contour of the unit will be determined by the predetermined internal volume or capacity of the blade. The thermal capacity of the fluid will aid in maintaining the temperature of the blade for forming. The fluid will prevent scaling of the interior. From this standpoint tin may be superior to lead. Other materials embodying the desired characteristics may, of course, be employed.

The blade will now be properly formed and completed. In other words, it will be flattened and incorporate the usual and desired degree of pitch throughout its entire length. Any desired or necessary polishing or trimming operations may be resorted to, such as removing excessive portions of the thickening 27 as shown in Fig. 10 to produce a unit having the sectional characteristics of that shown in Fig. 11. The inner end of the shank may be further cleaned and trimmed if that operation is necessary. It will, of course, be understood that prior to any such operation and immediately upon the removal of the blade from the die, the lead or other volume-retaining material is poured out and the blade is heat treated. Any residual retaining material may be dissolved out to dispose of the same.

Attention is now directed to Figs. 12 to 16 inclusive in which a three-section blade has been illustrated. Contrary to the shank portion of Fig. 2, the shank section 31 is preferably flattened or pre-shaped prior to being coupled with the blade section 32. This blade section does not include a tip section as an integral part. Rather, this is a separate unit as indicated by the reference numeral 33 in Fig. 12. The tip section may be formed in final shape by a machining operation or by forging. Also, it may be produced by a combination of such techniques. If formed of metal, it is coupled to the blade portion or section preferably by welding methods. These may be identical with the procedure as heretofore described in the coupling of sections in Figs. 1 to 9.

Thereafter, and prior to the connection of the body section with the shank section, the welding beads or other protuberances which may exist on the inner surface as well as the outer surface of the body and tip portions may be removed. As is apparent, such removal may, in certain instances, occur after the tip and body sections have been connected. This may be achieved in any desirable manner and as will be appreciated tools may be inserted through the body section to act throughout the aforementioned zone since the equivalent radius changes in magnitude unidirectionally. Only thereafter will the body section be connected to the shank section as previously described.

Again in this form of structure, a thickening of the leading and/or trailing edges will usually be necessary. This may be provided for in the manner heretofore described in connection with Figs. 5 and 8. In common with the blade of Fig. 1 and as illustrated especially in Fig. 13, the thickening conveniently occurs throughout the leading and trailing edges as indicated by the numeral 34. While it may continue for greater or lesser portions, it is preferred that, as shown in this figure, it commence at a point well spaced from the inner end of section 32 and in diminishing thickness continue to the outer end thereof. Where thickening is to be resorted to and as in Figs. 3 to 8, the section 32 is made with a larger diameter to compensate for the loss in diameter which will result from this operation.

At this time it is to be understood that in certain respects it is preferred to adopt a definite sequence of steps such as those heretofore and hereinafter described. However, that sequence need not necessarily be followed and, in fact, may in specialized instances be advantageously varied. Thus, in most blades, it is contemplated that thickening will be incorporated in both the leading and trailing edges. It is apparent that such thickening may, as afore brought out, be dispensed with entirely, especially in the case of the trailing edge. Where such thickening is resorted to, it is recommended that the step of providing the same be accomplished before any interior beading or rib structure, as hereinafter described, is incorporated within the blade. Under such circumstances and prior to the connection of the shank section with the blade section, undesired interior thickening at the trailing and leading edges will be removed; the body section at that moment being tubular or substantially so, so that its interior is readily accessible. Where a single or multiple bead or rib strengthening is provided, the undesired material is removed from the exterior faces of the blade either before or after the shank and body sections are coupled. Conveniently, this may occur prior to connection of these sections.

As is apparent, the blade sections may be connected by welding as indicated at 35 either while these sections are substantially tubular or after they have been flattened. In many respects, it is preferred that flattening as shown in Fig. 16 be accomplished before the weld connection is resorted to. This results in greater ease of handling. The tip may be formed of any desired material. However, it is only after all of the sections are connected that the blade is twisted to impart the desired final configuration thereto. During these forming steps, the interior of the blade may be filled with molten metal as heretofore traversed in connection with Figs. 9 and 10. If such forming be confined to the blade section and prior to its attachment to the shank and/or the tip section, then the ends of the blade section may be suitably plugged. As is apparent, this will serve to retain the molten metal or other fluid.

As previously brought out, blades constructed in accordance with the present invention may be manufactured from sheet metal rather than from a billet. Such type of construction has been generally illustrated in Figs. 17 to 23 inclusive. In Fig. 17 the reference numeral 42 indicates a sheet of steel or other suitable metal. If a blade approximately 6' long is to be made, then one end of this sheet may be approximately 25" while the opposite end thereof may be approximately 22" in width. Therefore, this preferably flat sheet varies in width in accordance with the variation of radius at any point in the blade which is to be formed therefrom. This sheet may be of uniform thickness, in which case the metal is taken down externally in a lathe or otherwise to produce the desired variation in thickness of the metal in a direction towards the tip of the blade. Aside from the fact that such procedure simplifies the welding problem, it is also in certain respects more desirable than attempting to prefabricate a tapered sheet which is subsequently rolled and welded. However, if the latter procedure is desired, it may be resorted to. According to the best aerodynamic teachings today, the sheet can vary in width linearly without compromise of any noticeable nature. However, the width of this sheet need not vary linearly if aerodynamic designs should dictate a change in blade width of such nature that a linearly varying sheet cannot be used.

Where a construction such as the foregoing is employed, then a separate tip section is preferably utilized; the procedure being similar to that illustrated and described in connection with Figs. 12 to 16 inclusive. In any event, the longitudinal edges 43 of the sheet 42 as shown in Fig. 18 are preferably beveled or undercut. The sheet is thereupon rolled to provide a tube and the adjacent edges 43 are united by any desired and proper form of welding procedure or otherwise.

The zone of welding has been indicated by the reference numeral 44 in Fig. 19. As also indicated in that figure, an internal bead 45 may result from such weld and provide a stiffening rib or bead. While ordinarily in a blade constructed from a sheet stiffening ribs are desirable, it will be apparent that if the bead 45 is to be eliminated, this may readily be achieved by simply machining the interior of the tube or otherwise removing the bead.

Having in mind that—as afore brought out— strengthening ribs or ridges are desirable, the blade is next positioned between supports 46 and 47 which may be in the nature of electromagnetic chuck portions. This has been illustrated in Fig. 20 as has also the fact that the weld zone 44 should preferably be disposed at the point indicated in that figure. In this view, it will also be noted that the supports have been recessed so as to accommodate thickened portions of the tube 42 and conceding that the leading and trailing edges of the blade are to be thickened. The procedure involved in the formation of such thickened portions has heretofore been traversed, especially in Figs. 5 to 8 inclusive. Electrodes 48 are clamped to the tube produced from the sheet 42 and a corresponding zone of the tube is heated in a manner as heretofore described in connection with the structure of Figs. 5 and 6. Simultaneously, pressure may be exerted by the supports 46 and 47 in order to provide an upset or thickened portion 49. During the application of this pressure, heating may be continued. It will be apparent that the operator may, with nicety, provide just the necessary amount of material between the electrodes and which material will furnish a strengthening rib or equivalent factor of adequate dimensions.

If the tube has now assumed an elliptical shape of too pronounced a degree, it may be reformed as previously described. As will also be understood, the exterior of the thickened portion 49 may be machined or otherwise treated in order to furnish a proper configuration. Thereupon, the tip section (50 as indicated in Fig. 21) may be attached to the body of the blade according to procedure heretofore traversed in Figs. 13 to 16 inclusive. All roughness, fins, notches, and pits may be machined or otherwise treated and the blade may thereupon be flattened, formed and twisted as previously described. Of course, the tip section may be added after such flattening.

The shank portion 51 is attached to the body portion and the interior surfaces of the joint are cleaned and smoothed to a reasonable extent since it is difficult and unnecessary to fully smooth this region. In any event, a blade such as has been shown in Figs. 21 to 23 results. In those figures, it will be observed that a blade is furnished which includes a shank portion 51, a body portion 52, and a tip section 50; all, in effect, integrally united. Extending throughout the body portion or at least a major portion thereof may be the strengthening rib 53 which is formed by the thickening or upsetting 49 as in Fig. 20. This rib as illustrated especially in Fig. 23 should preferably extend inwardly from the thrust face of the blade. If advantage is to be taken of the welding bead 45 to provide a stiffener, it may be at a position substantially opposite the bead 53. Thus, the stiffeners or ribs 45 and/or 53 are disposed at the proper points, i. e. substantially midway between the leading and trailing edges, which latter may, as afore brought out, be thickened either in one or both instances. In very wide blades several stiffening beads may be incorporated in the faces. They are disposed away from the edges and not necessarily in the center.

In forming the tube which becomes the body portion, two sheets may be used and a pair of welds are performed instead of a single weld as shown in Fig. 19. This may be advantageous where it is desired to produce a weld which is of rounded and smooth contour in the as-welded state as previously described. A pair of oppositely disposed weld beads prepared in this manner can then be the basis of a stiffener in each of the faces. Of course, a multitude of such welds may be performed for a multitude of such stiffeners although this method is not necessarily to be preferred.

As will be appreciated by those skilled in the art, a procedure such as is outlined in Figs. 17 to 20 is especially valuable and preferable in connection with the construction of small blades. By employing a sheet initially of uniform thickness and cut to shape as in Fig. 17, it is obvious that when rolled up and welded, it will be radial in cross section and will have a circumference at each point of its length equal to the circumference of the completed blade at that point. This will, of course, be in addition to any allowance which must be made for reduction in circumference incident to the upsetting operation traversed in connection with Fig. 20. An expanding tapered mandrel (not shown) corresponding to the required varying inside dimension is employed and has provision to accommodate the welding bead 45. This is inserted in the blade section. After the desired circular shape of the tube is restored, the mandrel is removed or else the mandrel may be left in position during the step in which the body of the blade is turned down so as to taper the metal thickness of this section in the direction of the blade tip. At the smallest point in the diameter, the desired metal thickness may taper down to approximately 0.060" or even less. After the upsetting operation illustrated in Fig. 20, the inside of the tube may again be rebored and reamed. As previously described, both the tip and shank sections 50 and 51 are preferably machined from a billet or, as understood in the art, the tip may be of another material since it is not a stressed portion of the blade.

The formation of the blade to final shape is resorted to preferably with the interior of the same filled with molten metal such as lead or tin as heretofore described in Figs. 9 and 10. The volume-retaining material is then poured out and the blade is heat treated as also heretofore described. As in the preceding description, if it is desired to form the blade section to final shape prior to the application of the shank and tip sections thereto, this may be achieved by filling the interior of the blade and plugging both ends of the same after it has been filled with molten metal. Thereupon, it is placed in a press in conjunction with dies. The shank and tip sections are formed to final shape by suitable machining operations or by forging and only connected to the blade section after the molten metal has been discharged and the other interior operations on this section have been completed. This will have the advantage of less expensive handling for the purpose of forming the final cross section from the radial section. Also, the use of molten metal may be preferred over any procedure involving the closing of the dies and the forcing of the blade surfaces into contact therewith by the use of compressed gas or other methods now known to the art for such purpose.

Regardless of the details of procedure which are followed, it will be apparent that a blade is produced in which the inside machining operation, the welding operations, and the forming steps are each facilitated. Also, certain of these steps may be far more thorough than has heretofore been practicable. In connection with each of them, substantial economies will be effected over previous methods of procedure. A blade results which has ideal weight distribution and contour with seams disposed in the areas of least vulnerability. The main width is more readily brought close to the shank. Substantial savings in material may be effected over other methods. It is feasible to incorporate stiffness and thicken the metal with the result that metal of lighter gauge may be used than would otherwise be possible. Aside from the economy thus resulting, substantial weight saving may be effected in the overall blade. No special blanks are required and jigs and fixtures may be of a comparatively simple nature easily changed to conform to changes in size or design of the blade. Essentially, the simplest type of tools and apparatus and the most generalized type of equipment is employed.

Thus, among others the several objects of the invention as specifically aforenoted are achieved. It is obvious that numerous changes in construction and rearrangements of the parts might be resorted to without departing from the spirit of the invention as defined by the claims. Likewise, it will be apparent that numerous variations in the individual steps of the method as well as the sequence, elimination and addition to such steps may be practiced without departing from the definition of the following claims.

I claim:

1. A method of forming a propeller blade which comprises forming a tubular metal blade section of tapering and decreasing wall thickness from shank end to tip end, passing electric heating currents transversely of the tube axis through a longitudinally extending narrow segment of said tubes, applying opposed pressure upon said tube along the length thereof at opposed sides of said segment to bulge the wall thickness inwardly and outwardly of said tube along said narrow segment by an amount decreasing in accordance with the decrease in wall thickness upon the softening of the metal due to the heating currents, removing outwardly bulged portions to provide a smooth external surface and an internal rib, and forming said tube to an airfoil section with said thickened wall portion positioned to form an internal rib midway between the leading and trailing edges of the blade section.

2. A method of forming a propeller blade which comprises forming a tubular metal blade section of tapering and decreasing wall thickness from shank end to tip end, passing electric heating currents transversely of the tube axis through opposed longitudinally extending narrow segments of said tubes, applying opposed pressure upon said tube along the length thereof at intervening points between said segments to bulge the wall thickness of said tube inwardly and outwardly along said narrow segments by an amount decreasing in accordance with the decrease in wall thickness upon the softening of the metal due to the heating currents, passing electric heating currents transversely of the tube axis through a longitudinally extending narrow segment of said tube disposed intermediate said previous segments, applying opposed pressure upon said tube along the length thereof at opposed sides of said segment to bulge the wall thickness of said tube inwardly and outwardly along said narrow segment by an amount decreasing in accordance with the decrease in wall thickness upon the softening of the metal due to the heating currents, removing outwardly bulged portions of the latter bulge to provide a smooth external surface and an internal rib, butt welding the shank end of said tube to a hollow shank section, and forming said tube and the abutting portion of said shank to an airfoil section with the other opposed outwardly protruding thickened wall portions positioned to form the leading and trailing edges of the blade section.

3. A method of forming a propeller blade which comprises forming a tubular metal blade section of tapering and decreasing wall thickness from shank end to tip end, passing electric heating currents transversely of the tube axis through opposed longitudinally extending narrow segments of said tubes, applying opposed pressure upon said tube along the length thereof at intervening points between said segments to bulge the wall thickness of said tube inwardly and outwardly along said narrow segments by an amount decreasing in accordance with the decrease in wall thickness upon the softening of the metal due to the heating currents, passing electric heating currents transversely of the tube axis through a longitudinally extending narrow segment of said tube disposed intermediate said previous segments, applying opposed pressure upon said tube along the length thereof at opposed sides of said segment to bulge the wall thickness of said tube inwardly and outwardly along said narrow segment by an amount decreasing in accordance with the decrease in wall thickness upon the softening of the metal due to the heating currents, removing outwardly bulged portions of said latter bulge to provide a smooth external surface and an internal rib, and forming said tube to an airfoil section with the outwardly protruding opposed thickened wall portions positioned to form the leading and trailing edges of the section.

ISAAC M. DILLER.

REFERENCES CITED

The following references are of record in the file of this patent:

UNITED STATES PATENTS

| Number | Name | Date |
|---|---|---|
| 1,339,970 | Murray | May 11, 1920 |
| 1,559,173 | Leitner | Oct. 27, 1925 |
| 1,872,067 | Furrer | Aug. 16, 1932 |
| 1,875,454 | Havill | Sept. 6, 1932 |
| 1,908,074 | Squires | May 9, 1933 |
| 1,942,222 | Squires | Jan. 2, 1933 |
| 1,948,832 | Squires | Feb. 27, 1934 |
| 1,996,850 | Bendix | Apr. 9, 1935 |
| 2,007,775 | Smith | July 9, 1935 |
| 2,011,121 | Sherman | Aug. 13, 1935 |
| 2,081,645 | Squires | May 25, 1937 |
| 2,117,688 | Stone | May 17, 1938 |
| 2,138,127 | Squires | Nov. 29, 1938 |
| 2,196,497 | Heman | Apr. 9, 1940 |
| 2,231,749 | Damerell | Feb. 11, 1941 |
| 2,231,750 | Damerell | Feb. 11, 1941 |
| 2,280,337 | McKee | Apr. 21, 1942 |
| 2,308,344 | Andrake | Jan. 12, 1944 |
| 2,370,136 | Berliner | Feb. 27, 1945 |
| 2,403,076 | Heath | July 2, 1946 |
| 2,406,457 | Enos | Aug. 27, 1946 |
| 2,457,202 | Brady | Dec. 28, 1948 |
| 2,457,889 | Gruetjen | Jan. 4, 1949 |
| 2,465,872 | Heath | Mar. 29, 1949 |
| 2,465,884 | Koppel | Mar. 29, 1949 |

FOREIGN PATENTS

| Number | Country | Date |
|---|---|---|
| 452,611 | Great Britain | Apr. 9, 1936 |
| 551,555 | Great Britain | July 14, 1942 |
| 555,230 | Great Britain | Aug. 11, 1943 |
| 565,580 | Germany | Dec. 3, 1932 |